(12) United States Patent
Huang et al.

(10) Patent No.: US 10,069,721 B2
(45) Date of Patent: Sep. 4, 2018

(54) COMMUNICATION DEVICE AND METHOD APPLICABLE TO STACKING COMMUNICATION SYSTEM

(71) Applicant: REALTEK SEMICONDUCTOR CORPORATION, Hsinchu (TW)

(72) Inventors: Mao-Lin Huang, Taoyuan (TW); Chun-Da Wu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 109 days.

(21) Appl. No.: 15/232,509

(22) Filed: Aug. 9, 2016

(65) Prior Publication Data

US 2017/0063688 A1    Mar. 2, 2017

(30) Foreign Application Priority Data

Aug. 27, 2015    (TW) .............................. 104128037 A

(51) Int. Cl.
*H04L 12/741* (2013.01)
*H04L 12/911* (2013.01)
*H04L 12/725* (2013.01)

(52) U.S. Cl.
CPC .................................. *H04L 45/306* (2013.01)

(58) Field of Classification Search
CPC ...... H04L 45/306; H04L 45/745; H04L 47/70
See application file for complete search history.

(56) References Cited

U.S. PATENT DOCUMENTS

| | | | |
|---|---|---|---|
| 6,425,015 B1 | 7/2002 | Jennings et al. | |
| 7,974,272 B2 | 7/2011 | Chang et al. | |
| 2004/0246956 A1 | 12/2004 | Meng | |
| 2005/0135357 A1 | 6/2005 | Riegel et al. | |
| 2012/0218977 A1* | 8/2012 | Seok ................ | H04W 74/0816 370/336 |
| 2012/0230240 A1* | 9/2012 | Nebat ................ | H04L 12/1881 370/312 |

(Continued)

FOREIGN PATENT DOCUMENTS

CN    1649341 B    3/2012

OTHER PUBLICATIONS

Office Action letter of the counterpart Taiwan application 104128037 dated Sep. 21, 2016.

(Continued)

*Primary Examiner* — Brian D Nguyen
(74) *Attorney, Agent, or Firm* — WPAT, PC

(57) ABSTRACT

The present invention discloses a communication device applicable to a stacking communication system. The communication device comprises: a plurality of communication ports operable to constitute a part of an internal transmission path of the stacking communication system; a storage unit operable to store a reference path table; and a controller operable to receive a frame and then determine whether the frame should be forwarded, wherein if the frame should be forwarded, the controller is operable to choose one among the communication ports according to the reference path table and the content of the frame to forward the frame or a frame derived therefrom to the internal transmission path of the stacking communication system.

10 Claims, 12 Drawing Sheets

(56) References Cited

U.S. PATENT DOCUMENTS

| | | | |
|---|---|---|---|
| 2013/0148663 A1* | 6/2013 | Xiong | H04L 45/745 370/392 |
| 2014/0079016 A1* | 3/2014 | Dai | H04L 5/0041 370/330 |
| 2014/0134539 A1* | 5/2014 | Sakuma | C07D 493/18 430/270.1 |
| 2015/0215898 A1* | 7/2015 | Nebat | H04L 12/1881 370/312 |

OTHER PUBLICATIONS

English abstract translation of the Office Action letter of the counterpart Taiwan application 104128037 dated Sep. 21, 2016.
CN 1649341B is also published as US20050135357.

* cited by examiner

310

| Destination | Port |
|---|---|
| 100 | -- |
| 210 | P2 |
| 220 | P2 |
| 230 | P2/P1 |
| 240 | P1 |
| 250 | P1 |

320

| Destination | Port |
|---|---|
| 100 | P3 |
| 210 | -- |
| 220 | P4 |
| 230 | P4 |
| 240 | P4/P3 |
| 250 | P3 |

330

| Destination | Port |
|---|---|
| 100 | P5 |
| 210 | P5 |
| 220 | -- |
| 230 | P6 |
| 240 | P6 |
| 250 | P6/P5 |

340

| Destination | Port |
|---|---|
| 100 | P7/P8 |
| 210 | P7 |
| 220 | P7 |
| 230 | -- |
| 240 | P8 |
| 250 | P8 |

350

| Destination | Port |
|---|---|
| 100 | P10 |
| 210 | P9/P10 |
| 220 | P9 |
| 230 | P9 |
| 240 | -- |
| 250 | P10 |

360

| Destination | Port |
|---|---|
| 100 | P12 |
| 210 | P12 |
| 220 | P12/P11 |
| 230 | P11 |
| 240 | P11 |
| 250 | -- |

Fig. 3

COMMUNICATION DEVICE AND METHOD APPLICABLE TO STACKING COMMUNICATION SYSTEM

BACKGROUND OF THE INVENTION

1. Field of the Invention

The present invention relates to a communication device and method, especially to a communication device and method applicable to a stacking communication system.

2. Description of Related Art

In a relative large-scale network topology, stacking technology is helpful to the connection of a plurality of physical network devices (e.g., a plurality of switches) for the accomplishment of a logical stacking network device (hereafter, stacking network system). Such stacking network system is superior to a single physical network device in forwarding efficiency and capability. Stacking technology allows a user to manage all of the physical network devices in a stacking network system and increases the overall packet forwarding capability of the stacking network system.

Regarding the current stacking technology, if two devices in a stacking network system intend to access resources from each other, the upper-layer application software of the two devices will carry out mutual communication through a standard Ethernet network frame and a known network communication protocol, in which the format of the standard Ethernet network frame must comply with a given specification and the length of the frame must be equal to or greater than 64 bytes so as to prevent the frame from being discarded as an invalid frame by a reception end. Accordingly, the said upper-layer application software has to include a complete communication protocol layer, which leads to the complexity of the mutual communication in practice. Besides, in order to prevent the generation of a network loop caused by the nonstop transmission of a frame among devices, some stacking technology will make use of a spanning tree protocol (STP) to set up a network break node. The STP is capable of converting a complicated topology into a tree configuration in logic and configuring the port(s) of each device in a stacking system to make the port(s) block or forward a frame, so as to prevent the generation of a network loop; however, this process will consume a lot of calculation resources. People who are interested in the STP may refer to IEEE 802.1 standard(s) (e.g., 802.1Q standard, 802.1D standard, etc.).

SUMMARY OF THE INVENTION

In consideration of the problems of the prior art, an object of the present invention is to provide a communication device and method applicable to a stacking communication system for the improvement over the prior art.

The present invention discloses a communication device applicable to a stacking communication system and capable of sending a frame according to a path table. An embodiment of the communication device comprises: a plurality of communication ports; a storage unit; and a controller. The plurality of communication ports is operable to constitute a part of an internal transmission path of a stacking communication system. The storage unit is operable to store a reference path table. The controller is operable to receive a frame and then determine whether the frame should be forwarded in accordance with the content of the frame, and if the frame should be forwarded, the controller is configured to choose one among the communication ports according to the reference path table and the content of the frame to forward the frame or the derivative frame thereof to the internal transmission path of the stacking communication system.

The present invention also discloses a method applicable to a stacking communication system and capable of transmitting a frame including a plurality of operation items. This method is carried out by a communication device which includes a plurality of communication ports operable to constitute a part of an internal transmission path of the said stacking communication system. An embodiment of the method comprises the following steps: upon the reception of a frame, determining whether the frame should be forwarded according to the content of the frame; and if the frame should be forwarded, forwarding the frame or the derivative frame thereof to an internal transmission path of a stacking communication system through at least one of multiple communication ports, wherein the frame includes an identifier of a source device pertaining to the stacking communication system, an identifier of a destination device pertaining to the stacking communication system, and a plurality of operation items including a plurality of data access operation items or including a semaphore operation item, operable to control the permission to use a resource, and a data access operation item.

Another embodiment of the aforementioned method is capable of sending a broadcast frame of a non-standard format, and similarly carried out by a communication device including a plurality of communication ports operable to constitute a part of an internal transmission path of a stacking communication system. This embodiment comprises the following steps: determining whether a transmission event is triggered; and when the transmission event is triggered, sending a broadcast frame or the derivative frame thereof from each of multiple communication ports to an internal transmission path of a stacking communication system, in which the broadcast frame or the derivative frame thereof does not comply with the format of a standard Ethernet network frame and includes an identifier of a source device pertaining to the stacking communication system, a serial number code operable to define a version of the frame, and broadcast content.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 3 illustrates an embodiment of the reference path table of the communication device of FIG. 2.

DETAILED DESCRIPTION OF THE PREFERRED EMBODIMENTS

The following description is written by referring to terms acknowledged in this invention field. If any term is defined in this specification, such term should be explained accordingly.

The present disclosure includes a communication device and a communication method, both of which are applicable to a stacking communication system and capable of communicating with the other devices in the stacking communication system in a simple and efficient manner while the problem of a network loop can be avoided. Some element of the said communication device could be known, and the detail of such element will be omitted provided that the written description and enablement requirements are fulfilled. The said communication method can be carried out by the communication device of the present invention or the equivalent thereof.

Figure 1:
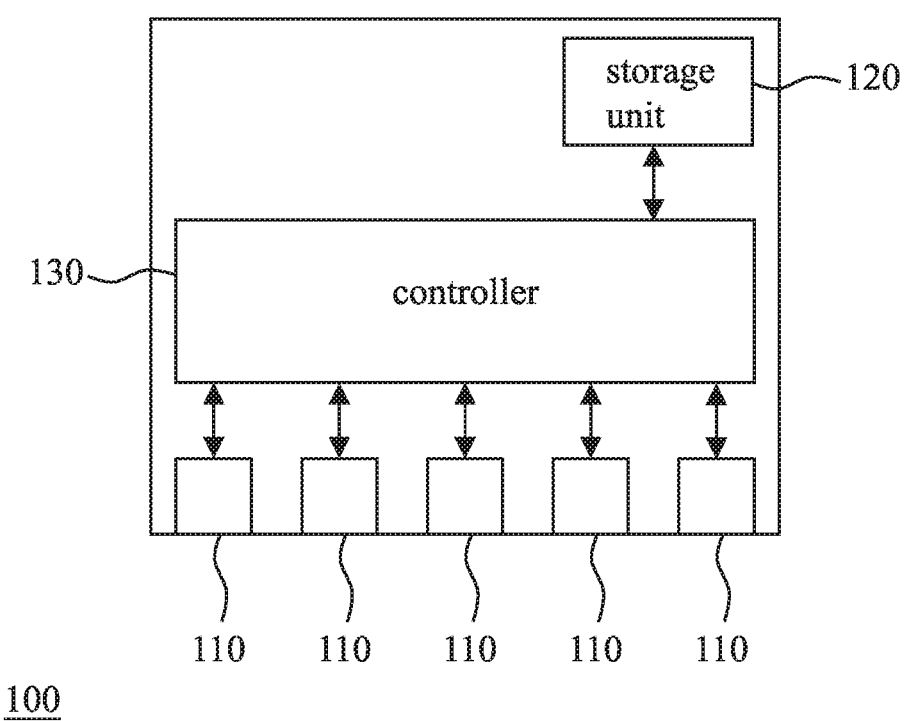
FIG. 1 illustrates an embodiment of the communication device of the present invention applicable to a stacking communication system.
Figure 2:
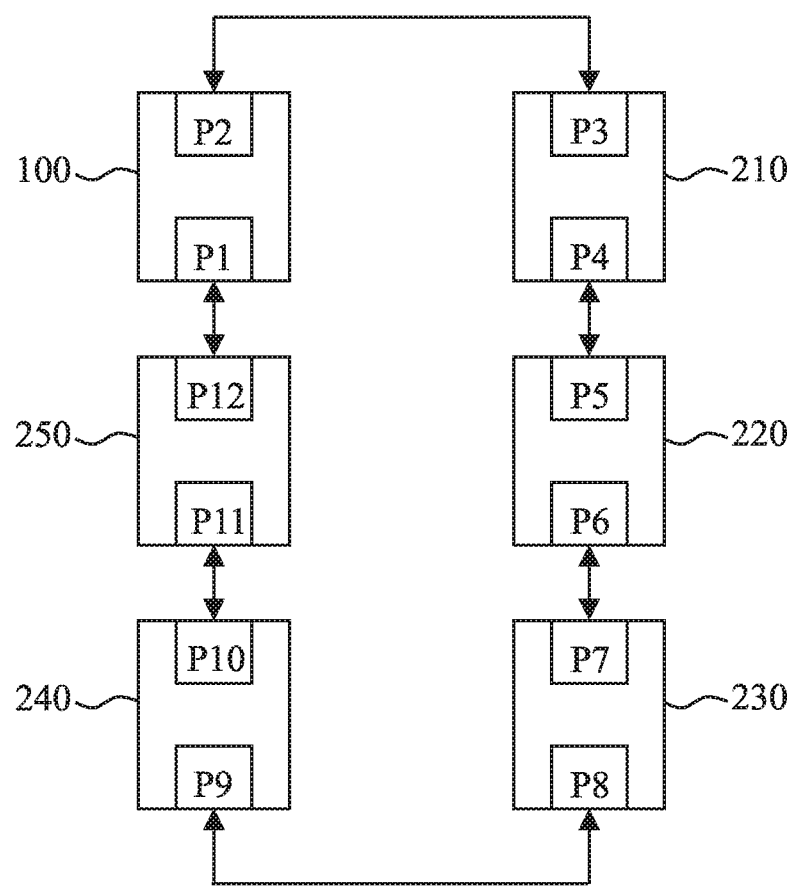
FIG. 2 illustrates an embodiment of the stacking communication system to which the communication device of FIG. 1 is applicable.

Please refer to FIG. 1 which illustrates an embodiment of the communication device of the present invention. As it is shown in FIG. 1, the communication device 100 in this embodiment, operable to send a frame according to a path table, includes: a plurality of communication ports 110; a storage unit 120; and a controller 130. Each of the said communication ports 110 could be at least an input/output (I/O) pin of an integrated circuit (while the communication device 100 could be in the form of an integrated circuit), at least a transmission line on a circuit board (while the communication device 100 could be in the form of a communication interface card) or at least a connector terminal (while the communication device 100 could be in the form of an end product such as a switch or a router), and is operable to constitute a part of an internal transmission path of a stacking communication system. When the communication device 100 is in the form of a communication interface card or an end product, it will further include a physical layer circuit, a connector, and so on and so forth for connection, which depends on the function(s) of the communication device 100 of FIG. 1. Since the physical layer circuit, the connector and general circuits for connection are well known in this field, the detail thereof is thereby omitted. An embodiment of the above-mentioned stacking communication system is shown in FIG. 2, including the communication device 100 of FIG. 1 and the other communication devices 210, 220, 230, 240, 250 connected in a ring configuration. It should be noted that the number of communication devices may vary with the demand of a designer or a user making use of the present invention, and a linear configuration or other kinds of configuration may be used instead by the same. Besides, each of the communication devices 210, 220, 230, 240, 250 in this embodiment includes a plurality of communication ports capable of executing the function of the communication ports 110, a storage unit, including a path table, capable of executing the function of the storage unit 120, and a controller capable of executing the function of the controller 130, so that these communication devices as a whole can achieve the function of rapidly forwarding frames. However, the present invention is also applicable to a stacking communication system composed of different kinds of communication devices (e.g., only some of the communication devices includes a path table). In addition, the communication ports of the communication devices 100, 210, 220, 230, 240, 250 in FIG. 2 are labeled with P1 through P12; the communication path among the communication devices 100, 210, 220, 230, 240, 250 is deemed an embodiment of the aforementioned internal transmission path of the stacking communication system.

Please refer to FIG. 1. The storage unit 120 is operable to store a reference path table which is a least-bridging-times path table for frame transmission in this embodiment. The least-bridging-times could be understood by the following explanation: when a frame is transmitted from a frame transmission device to a frame reception device through a path, the number of the communication device(s) between the frame transmission and reception devices is minimum. Take the stacking communication system of FIG. 2 for example. The least-bridging-times path tables of the communication devices 100, 210, 220, 230, 240, 250 are the path tables 310, 320, 330, 340, 350, 360 in turn. As it is shown in FIG. 3, the path table recites the communication port(s) associated with the destination of a frame and allows the frame to arrive in the destination device with the least bridging times. For instance, the reference path table 310 of the communication device 100 recites "Destination: 240" and "Port: P1" indicating that the frame should be forwarded through the port P1 for reaching the least bridging times when the destination device is the communication device 240 (Destination: 240), "Destination: 220" and "Port: P2" indicating that the frame should be forwarded through the port P2 when the destination device is the communication device 220 (Destination: 220), "Port: —" indicating that the frame has no need to be forwarded, and "Port: P2/P1" indicating that the frame can be forwarded through either of the communication ports P2 and P1 to reach the least bridging times. The other content in this table and the other path tables could be understood in accordance with the above exemplary explanation. It should be noted that P1 through P12 are codes for the communication ports, number 100 through number 250 are codes/identifications for the communication devices, and these codes are used for recognition, not for limitation to the implementation of the present invention. Furthermore, the wordings "Destination", "Port", etc. are used for understanding, not required to be present in the path table. It should also be noted that although the embodiment of FIG. 3 adopts least-bridging-times path tables, people of ordinary skill in the art can carry out the present invention with other kinds of prescribed path tables such as a table determined by the responding time of a destination device for receiving a frame.

Please refer to FIG. 1. The said controller 130 could be a circuit including a processor, a data link layer circuit, or the like operable to receive a frame and determine whether the frame should be forwarded according to the content of the frame. More specifically, the controller 130 can analyze a frame and determine whether this frame is sent to the communication device 100 according to the destination device identifier in the content of the frame. If it is not sent to the communication device 100, the frame should be forwarded; hence, the controller 130 will choose one among the communication ports 110 according to the reference path table and the content of the frame (including the destination device identifier) to forward the frame or the derivative frame thereof to the internal transmission path of the stacking communication system, in which the derivative frame is generated according to the content of the frame by the controller 130. For instance, the derivative frame could be generated by updating some content of the frame. It should be noted that people of ordinary skill in the art can make the controller 130 with the existing software and/or hardware elements and configurations in light of the disclosure of this specification, and therefore the redundant detail is omitted.

Figure 4:
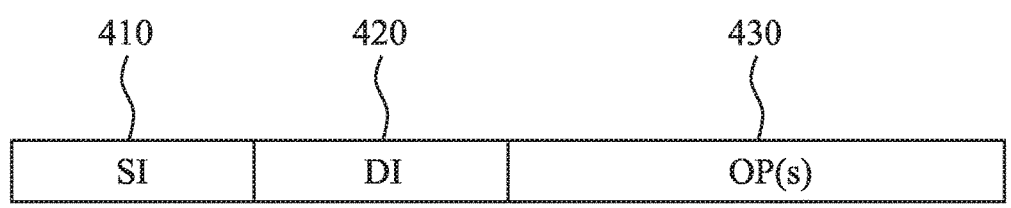
FIG. 4 illustrates an embodiment of the frame received by the communication device of FIG. 1.

Please refer to FIG. 1 and FIG. 2. In order to simplify operation, an embodiment of the frame received by the communication device 100 is illustrated by FIG. 4, including an identifier 410 of a source device (i.e., the label SI in the figure), an identifier 420 of a destination device (i.e., the label DI in the figure) and at least an operation item 430 (i.e. the label OP(s) in the figure), in which each operation item includes an action indication (e.g., an access action indication or a configuration action indication) and may optionally include an object identifier indicating an object (e.g., an object to be accessed or an object to be configured) upon which the action indication has its effect. However, if the action indication does not specify an object or has no need to do so, the object identifier is not necessary. The said source device and the communication device 100 pertain to the same stacking communication system (e.g., the stacking communication system of FIG. 2) and the source device generates the frame. The said destination device also pertains to the same stacking communication system, could be the communication device 100 or one of the other communication devices in the stacking communication system, and is the destination of the frame. The said at least one operation item is operable to indicate at least one operation, and may include a plurality of operation items for the prevention of inefficiency caused by one single frame carrying one single indication in the prior art. For instance, the at least one operation could be a semaphore operation, a data access operation, etc. The semaphore operation is operable to control (e.g., lock or unlock) the permission to use a resource which could be a table, a register, the control of a physical layer, etc. The data access operation could be a write operation, a read operation, etc. The said object identifier is operable to indicate an object in the destination device, and the object may be the resource to be controlled, the data to be accessed, etc. Each of the said semaphore operation and data access operation is known in this field, and the detail thereof is omitted.

Figure 5:
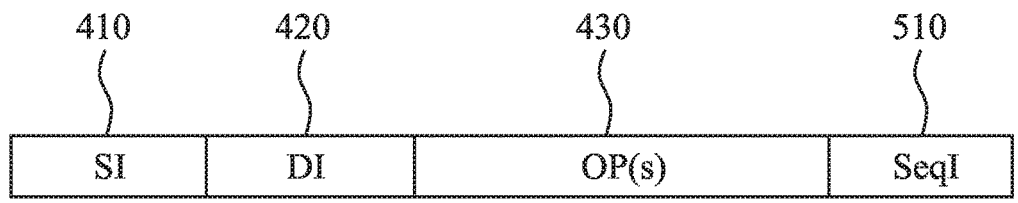
FIG. 5 illustrates another embodiment of the frame received by the communication device of FIG. 1.
Figure 6:
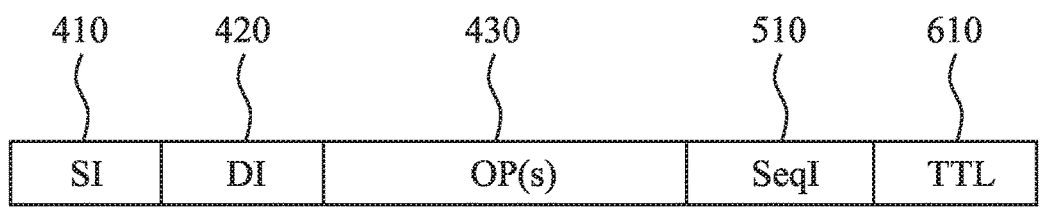
FIG. 6 illustrates a further embodiment of the frame received by the communication device of FIG. 1.

Please refer to FIG. 1 and FIG. 2. Due to transmission latency and/or bad communication quality, the communication device 100 may receive a response frame in reply to a transmission frame sent previously after the device 100 determines that the delivery of the transmission frame failed. In order to prevent the communication device 100 from mistaking an outdated response frame as the response frame in reply to the latest transmission frame, the transmitted frame and/or the received frame of the communication device 100 may further include a serial number code 510 as shown in FIG. 5. The serial number code 510 is treated as the basis for determining which transmitted frame is associated with the received frame. Therefore, if the communication device 100 determines that the received frame is an outdated response frame in accordance with the serial number code 510, it can discard this response frame or execute a predetermined process. Besides, in order to prevent a frame from being forwarded continuously for preserving transmission resources, the transmitted frame and/or the received frame of the communication device 100 may further include a time-to-live (TTL) indication 610 operable to indicate the valid term of the frame; furthermore, the controller 130 can update the TTL indication 610 and thereby generate and forward the derivative frame of the received frame. For instance, the TTL indication 610 could be a number which will decrease as the bridging times increase during the transmission of the frame. When the communication device 100 receives the frame, it will determine whether the TTL indication 610 is zero; if the TTL indication 610 is not zero, the communication device will decrease the TTL indication 610 by one to update the TTL indication 610, and forward the frame according to the identifier of the destination device of the frame and the aforementioned reference path table; if the TTL indication 610 is zero, the communication device 100 will stop forwarding the frame. It should be noted that the above description of updating the TTL indication 610 is merely exemplary, and people of ordinary skill in the art can use any predetermined algorithm to update a TTL indication (e.g., update a TTL indication by increasing the number of the TTL indication as the bridging times increase) and determine whether the frame is outdated by comparing the TTL indication with a TTL threshold (e.g., a threshold value).

Please refer to FIG. 2. Generally speaking, after sending a frame, a source device in a stacking communication system will wait a reply from a destination device in the stacking communication system. In order to prevent long wait, the source device can count predetermined time after sending the frame; and if the source device receives no reply (i.e. reply from the destination device) in response to the frame by the end of the counting of the predetermined time, the source device will deem the transmission of the frame failed. Besides, please refer to FIG. 1 and FIG. 4. The length of the frame received by the communication device 100 may be less than 64 bytes, which is less than (or does not comply with) the length of a standard Ethernet network frame that is applied in the prior art. In other words, the communication device 100 of FIG. 1 is capable of identifying/recognizing a frame less than 64 bytes while the device of the prior art will discard such frame.

Figure 7:
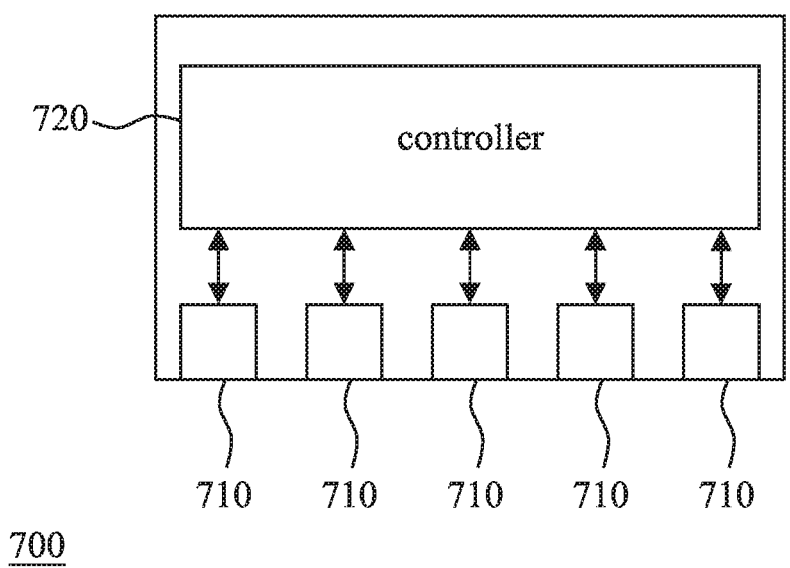
FIG. 7 illustrates another embodiment of the communication device of the present invention applicable to a stacking communication system.
Figure 8:
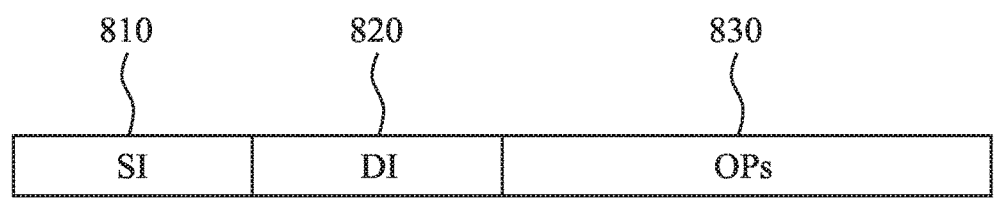
FIG. 8 illustrates an embodiment of the frame received by the communication device of FIG. 7.

Another embodiment of the communication device of the present invention applicable to a stacking communication system is shown in FIG. 7. This embodiment is capable of sending a frame including a plurality of operation items, but not required to send the frame according to the aforementioned reference path table. The communication device 700 in FIG. 7 comprises a plurality of communication ports 710 and a controller 720. The said communication ports 710 are operable to constitute a part of an internal transmission path of a stacking communication system (e.g., the stacking communication system in FIG. 2). The said controller 720 is operable to determine whether a frame should be forwarded in accordance with the content of the frame when receiving the frame; if the frame should be forwarded, the controller 720 is operable to forward the frame or the derivative frame thereof to the internal transmission path of the stacking communication system through at least one of the communication ports 710 in accordance with the content of the frame, in which the derivative frame is generated according to the content of the frame by the controller 720. In this embodiment, the frame received by the controller 700, as shown in FIG. 8, includes: an identifier 810 (i.e., the label SI in the figure) of a source device pertaining to the stacking communication system; an identifier 820 (i.e., the label DI in the figure) of a destination device pertaining to the stacking communication system; and a plurality of operation items (i.e., the label OPs in the figure) including a plurality of data access operation items or including a semaphore operation item and a data access operation item, in which the semaphore operation item is operable to control (e.g., to lock or unlock) permission to use a resource. Each of the above-mentioned operation items may further include an object identifier optionally. Since those of ordinary skill in the art can appreciate the detail and modification of the embodiment of FIG. 7 by referring to the embodiments of FIG. 1 through FIG. 6, which means that the features of FIG. 1 through FIG. 6 and the description thereof can be applied to the embodiment of FIG. 7 in a reasonable way, repeated and redundant description is therefore omitted.

On the basis of the above, in order to prevent the locked resource cannot be accessed by the other communication devices in the stacking communication system due to some problem (e.g., the communication device, which locked the resource, removed from the stacking communication system or the occurrence of erroneous operation), the communication device holding the resource (i.e., the destination device which received a frame including a semaphore operation item) can optionally count predetermined time after receiving the frame or the derivative frame thereof and locking the permission to use the resource, and then unlock the permission to use the resource after finishing counting the predetermined time. Accordingly, even if the communication device that locked the resource fails to unlock the resource due to some problem, the resource can be unlocked automatically. The said counting can be done with a counter or the equivalent thereof. In addition, in order to ensure the communication device that locked the resource having the permission to use the resource, if the communication device holding the resource determines that a recount event is triggered during the period of counting the predetermined time, the communication device can recount the predetermined time. For instance, the recount event will be triggered if the communication device that locked the resource actually accesses the resource within the period of counting the predetermined time.

Figure 9:
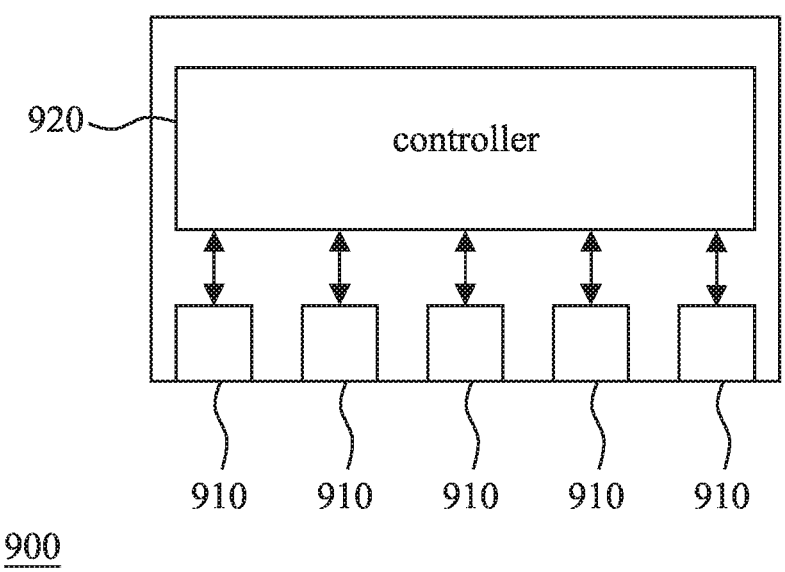
FIG. 9 illustrates a further embodiment of the communication device of the present invention applicable to a stacking communication system.
Figure 10:
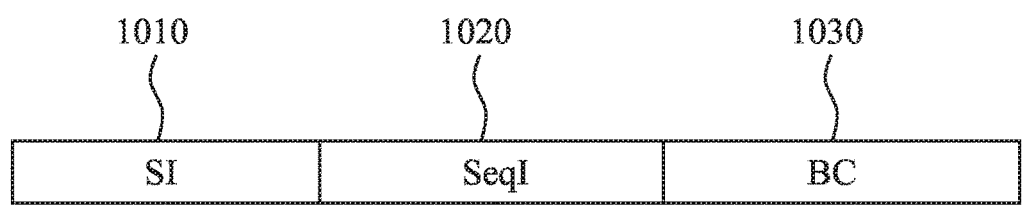
FIG. 10 illustrates an embodiment of the frame received by the communication device of FIG. 9.

Another embodiment of the communication device of the present invention applicable to a stacking communication system is shown in FIG. 9, capable of sending a broadcast frame of a non-standard format. Compared to the embodiment of FIG. 1, this embodiment will send the same frame from a plurality of communication ports. The communication device 900 in FIG. 9 includes a plurality of communication ports 910 and a controller 920. The communication ports 910 are operable to constitute a part of an internal transmission path of a stacking communication system (e.g., the stacking communication system in FIG. 2). The controller 920 is operable to send a broadcast frame or the derivative frame thereof from each of the communication ports 910 to the internal transmission path of the stacking communication system when a transmission event is triggered, in which the derivative frame such as a broadcast frame with an updated TTL indication is generated according to the broadcast frame by the communication device 900. The length of the said broadcast frame or the derivative frame thereof is allowed to be less than 64 bytes, or the broadcast frame or the derivative frame thereof does not comply with the format of a standard Ethernet network frame. Furthermore, the broadcast frame or the derivative frame thereof, as shown in FIG. 10, includes: an identifier 1010 (i.e., the label SI in the figure) of a source device pertaining to the stacking communication system; an identifier 1020 (i.e., the label SeqI in the figure) operable to define the version of the frame; and broadcast content 1030 (i.e., the label BC in the figure). Since those of ordinary skill in the art can appreciate the detail and modification of the embodiment of FIG. 9 by referring to the embodiments of FIG. 1 through FIG. 8, which means that the features of FIG. 1 through FIG. 8 can be applied to the embodiment of FIG. 9 in a reasonable way, repeated and redundant description is therefore omitted.

On the basis of the above, in this embodiment, if the broadcast frame is generated and sent by the communication device 900, the aforementioned transmission event could be the change of connection environment detected by the communication device 900. For instance, the transmission event may be triggered once the communication device 900 finds that its link partner is removed or changed. When the transmission event is triggered, the communication device 900 may collect related data, update a serial number, generate a broadcast frame and send the broadcast frame. However, the communication device 900 may generate the broadcast frame in accordance with a known or a self-developed procedure.

Besides, in this embodiment, if the broadcast frame is not generated and sent by the communication device 900, which means that the broadcast frame is received by the communication device 900 from the other device of the stacking communication system, the controller 920 can determine whether the version of the broadcast frame is outdated in accordance with a serial number of the broadcast frame. If the version of the broadcast frame is outdated, the controller 920 can determine that the transmission event is not triggered, and thereby send no broadcast frame or the derivative frame thereof. For instance, if the controller 920 has received a broadcast frame carrying the same serial number or a newer serial number previously, the controller 920 will determine the version of the currently received broadcast frame is outdated and will not forward the outdated broadcast frame. Moreover, in order to prevent a broadcast frame from being forwarded repeatedly and consuming transmission resources, the broadcast frame that is generated and sent by the communication device 900 may further include a TTL indication to indicate the valid term of the broadcast frame, or the broadcast frame that is not generated by the communication device 900 may be updated to be a derivative frame which carries an up-to-date TTL indication and then forwarded.

Figure 11:
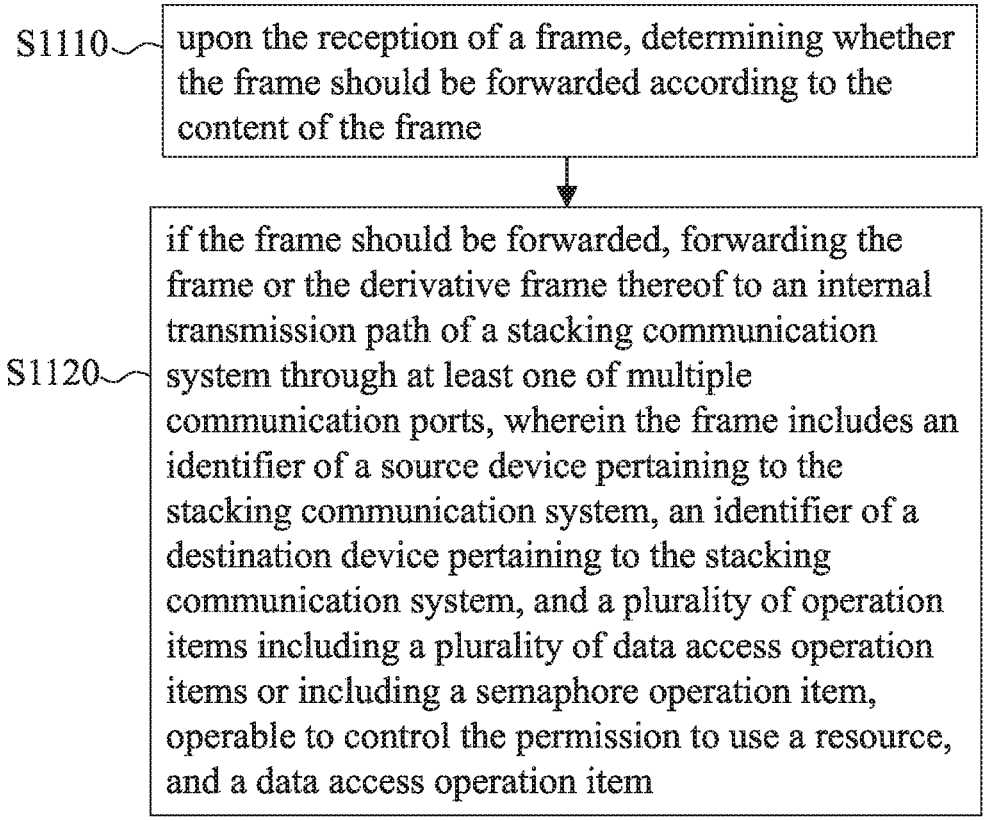
FIG. 11 illustrates an embodiment of the communication method of the present invention applicable to a stacking communication system.

In addition to the aforementioned device, the present invention further discloses a communication method applicable to a stacking communication system. This method is capable of sending a frame including a plurality of operation items, and carried out by a communication device (e.g., the communication device 700 in FIG. 7). Such communication device includes a plurality of communication ports operable to constitute a part of an internal transmission path of the said stacking communication system. An embodiment of the communication method is illustrated in FIG. 11, comprising the following steps:

Step S1110: upon the reception of a frame, determining whether the frame should be forwarded according to the content of the frame. This step can be executed by the controller 720 of FIG. 7 or the equivalent thereof.

Step S1120: if the frame should be forwarded, forwarding the frame or the derivative frame thereof to an internal transmission path of a stacking communication system through at least one of multiple communication ports, wherein the frame includes an identifier of a source device pertaining to the stacking communication system, an identifier of a destination device pertaining to the stacking communication system, and a plurality of operation items including a plurality of data access operation items or including a semaphore operation item, operable to control the permission to use a resource, and a data access operation item. This step can be executed by the controller 720 and the communication ports 710 of FIG. 7 or the equivalent thereof.

Figure 12:
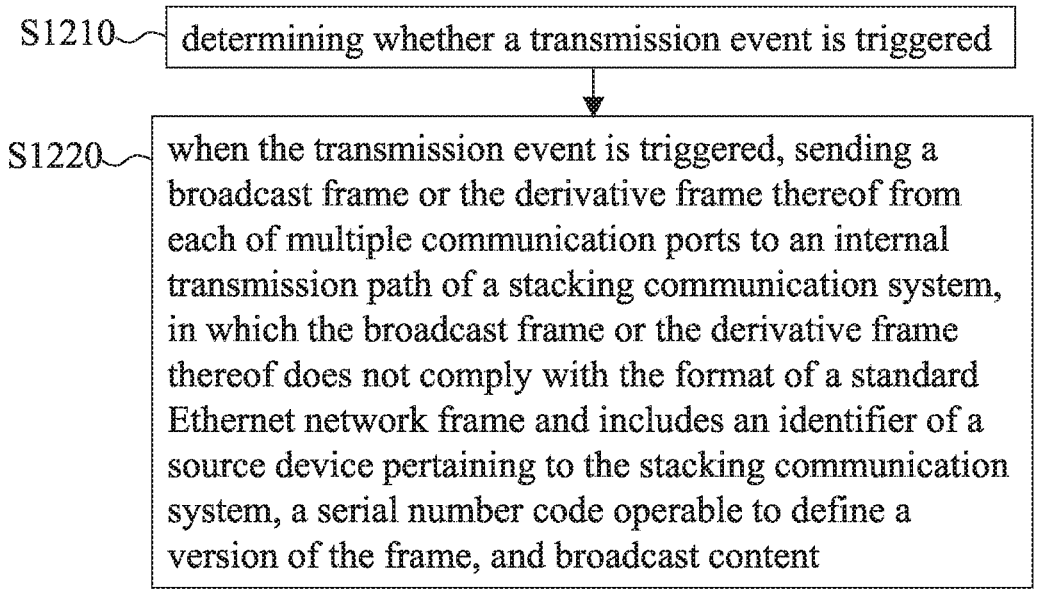
FIG. 12 illustrates another embodiment of the communication method of the present invention application to a stacking communication system.

Another embodiment of the communication method applicable to a stacking communication system is illustrated in FIG. 12, which is capable of sending a broadcast frame of a non-standard format and carried out by a communication device (e.g., the communication device 900 in FIG. 9). Such communication device includes a plurality of communication ports operable to constitute a part of an internal transmission path of the said stacking communication system. The embodiment of FIG. 12 includes the following steps:

Step S1210: determining whether a transmission event is triggered. This step can be carried out by the controller 920 of FIG. 9 or the equivalent thereof.

Step S1220: when the transmission event is triggered, sending a broadcast frame or the derivative frame thereof from each of multiple communication ports to an internal transmission path of a stacking communication system, in which the broadcast frame or the derivative frame thereof does not comply with the format of a standard Ethernet network frame and includes an identifier of a source device pertaining to the stacking communication system, a serial number code operable to define a version of the frame, and broadcast content. This step can be executed by the controller 920 and the communication ports 910 of FIG. 9 or the equivalent thereof.

Since people of ordinary skill in the art can appreciate the detail and modification of the method embodiments of FIG. 11 and FIG. 12 by referring to the device embodiments of FIG. 1 through FIG. 10, which implies that the features of the device embodiments can be applied to the method embodiments in a reasonable way, therefore repeated and redundant description are omitted.

In summary, the communication device and method of the present invention are applicable to a stacking communication system, and able to efficiently communicate with the other devices in the same stacking communication system through one or multiple features such as a path table, a non-standard frame including a plurality of operation items, and a frame including a TTL indication. Furthermore, the communication device and method of the present invention can prevent the occurrence of a network loop without the spanning tree protocol.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A communication device in a stacking communication system of a ring configuration or a linear configuration, the communication device comprising:
    a plurality of communication ports operable to be a part of an internal transmission path of the stacking communication system;
    a storage unit operable to store a reference path table; and
    a controller operable to receive a frame and then determine whether the frame should be forwarded in accordance with a content of the frame, in which if the frame should be forwarded, the controller is configured to choose one of the communication ports according to the reference path table and the content of the frame so as to forward the frame or a derivative frame of the frame to the internal transmission path of the stacking communication system.

2. The communication device of claim 1, wherein the communication device is a first communication device in the stacking communication system while the stacking communication system further includes other communication devices including a second communication device, the first communication device and the other communication devices in the stacking communication system are connected in the ring configuration or the linear configuration, the reference path table associates each of the other communication devices with one of the communication ports, and when a destination address in the content of the frame indicates the second communication device, the controller forwards the frame or the derivative frame through a designated communication port of the communication ports that is associated with the second communication device according to the reference path table.

3. The communication device of claim 2, wherein a transmission path between the second communication device and the designated communication port involves N communication device/devices of the other communication devices, any transmission path between the second communication device and any of the communication ports except the designated communication port involves at least M communication device/devices of the other communication devices, each of the N and the M is an integer not less than zero, and the N is not greater than the M.

4. The communication device of claim 1, wherein the frame includes:
    an identifier of a source device pertaining to the stacking communication system;
    an identifier of a destination device pertaining to the stacking communication system; and
    at least an operation item for an indication of at least an operation.

5. The communication device of claim 4, wherein the at least an operation includes a plurality of data access operations or includes a semaphore operation and a data access operation, in which the semaphore operation is operable to control permission to use a resource.

6. The communication device of claim 4, wherein the frame further includes: a serial number code operable to define a version of the frame.

7. The communication device of claim 4, wherein the frame further includes a time-to-live (TTL) indication operable to indicate a valid term of the frame, and the controller is operable to update the TTL indication and generate and forward the derivative frame accordingly.

8. The communication device of claim 4, wherein the controller is further operable to select one of the communication ports according to the reference path table so as to transmit a transmission frame to the internal transmission path of the stacking communication system, and the communication device counts for predetermined time after transmitting the transmission frame and determines that the transmission frame is not successfully transmitted to a destination if the communication device receives no acknowledgement in response to the transmission frame within the predetermined time.

9. A communication method carried out by a communication device in a stacking communication system of a ring configuration or a linear configuration, the communication device including a plurality of communication ports operable to be a part of an internal transmission path of the stacking communication system, the method comprising the following steps:

upon reception of a frame, determining whether the frame should be forwarded according to a content of the frame; and if the frame should be forwarded, forwarding the frame or a derivative frame of the frame to the internal transmission path of the stacking communication system through at least one of the communication ports, wherein the frame includes: an identifier of a source device pertaining to the stacking communication system; an identifier of a destination device pertaining to the stacking communication system; and a plurality of operation items including a plurality of data access operation items or including a semaphore operation item and a data access operation item, in which the semaphore operation is operable to control permission to use a resource.

10. A communication method carried out by a communication device in a stacking communication system of a ring configuration or a linear configuration, the communication device including a plurality of communication ports operable to be a part of an internal transmission path of the stacking communication system, the method comprising the following steps:

determining whether a transmission event is triggered; and when the transmission event is triggered, sending a broadcast frame or a derivative frame of the broadcast frame from each of the communication ports to the internal transmission path of the stacking communication system, in which each of the broadcast frame and the derivative frame does not comply with a format of a standard Ethernet network frame so that a length of each of the broadcast frame and the derivative frame is less than 64 bytes, wherein the broadcast frame or the derivative frame includes: an identifier of a source device pertaining to the stacking communication system; a serial number code operable to define a version of the frame; and broadcast content.

\* \* \* \* \*